(12) United States Patent
Suzuki (10) Patent No.: US 10,584,674 B2
(45) Date of Patent: Mar. 10, 2020

(54) HYDROELECTRIC GENERATING DEVICE (71) Applicant: NTN CORPORATION, Osaka-shi, Osaka (JP)

(72) Inventor: Masahiko Suzuki, Hamamatsu (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/078,824

(22) PCT Filed: Dec. 7, 2016

(86) PCT No.: PCT/JP2016/086365
§ 371 (c)(1),
(2) Date: Aug. 22, 2018

(87) PCT Pub. No.: WO2017/145489
PCT Pub. Date: Aug. 31, 2017

(65) Prior Publication Data
US 2019/0055913 A1 Feb. 21, 2019

(30) Foreign Application Priority Data
Feb. 24, 2016 (JP) .................................. 2016-033046

(51) Int. Cl.
*F03B 3/04* (2006.01)
*F03B 17/06* (2006.01)
*F16H 1/14* (2006.01)

(52) U.S. Cl.
CPC .............. *F03B 3/04* (2013.01); *F03B 17/061* (2013.01); *F16H 1/14* (2013.01); *F05B 2220/20* (2013.01);
(Continued)

(58) Field of Classification Search
CPC ......... Y02E 10/22; Y02E 10/223; F03B 1/00; F03B 3/04
(Continued)

(56) References Cited

U.S. PATENT DOCUMENTS 4,143,990 A * 3/1979 Atencio ................... E02B 9/00
290/53
4,447,739 A * 5/1984 Ferguson ................ F03B 3/128
290/52
(Continued)

FOREIGN PATENT DOCUMENTS

FR 2571101 A1 * 4/1986 .............. F03B 13/08
JP 2000-009012 A 1/2000
(Continued)

OTHER PUBLICATIONS

International Search Report Corresponding to PCT/JP2016/086365 dated Feb. 28, 2017.
(Continued)

*Primary Examiner* — Frederick L Lagman
(74) *Attorney, Agent, or Firm* — Davis & Bujold PLLC; Michael J. Bujold (57) ABSTRACT A hydraulic power generating apparatus which can be easily disposed in a water channel, such as a waterway or a water conducting pipe. The hydraulic power generating apparatus comprises a horizontal rotor supporting housing (4) having a rotor, a holding body (5) erected on an upper surface of the rotor supporting housing (4), a support ring (2) in which the rotor supporting housing (4) is fixed, and a power generator (11). The rotor supporting housing (4) is integrally fixed within the support ring (2) by the holding body (5). The power generator (11) is disposed on the upper part of the holding body (5) protruding from the support ring (2), and the support ring (2) is formed with attachment portions (2A, 2B) for fixing the rotor supporting housing (4) in a water channel.

14 Claims, 6 Drawing Sheets (52) U.S. Cl.
CPC ..... *F05B 2260/5032* (2013.01); *Y02E 10/223* (2013.01); *Y02E 10/28* (2013.01)

(58) Field of Classification Search
USPC .......................................................... 405/78
See application file for complete search history.

(56) References Cited

U.S. PATENT DOCUMENTS

| | | | | |
|---|---|---|---|---|
| 4,720,640 | A * | 1/1988 | Anderson | F03B 13/083 290/43 |
| 2007/0284884 | A1* | 12/2007 | Stothers | F03B 3/04 290/54 |
| 2010/0066089 | A1* | 3/2010 | Best | F03B 3/06 290/52 |
| 2013/0195655 | A1* | 8/2013 | Kerner | F03D 7/0236 416/1 |
| 2014/0312624 | A1* | 10/2014 | da Silva | F03B 3/06 290/52 |

FOREIGN PATENT DOCUMENTS

| | | | |
|---|---|---|---|
| JP | 2006-189014 A | | 7/2006 |
| JP | 2010216374 | * | 3/2010 |
| JP | 2012-132335 A | | 7/2012 |
| JP | 2013-189862 A | | 9/2013 |
| WO | WO-2019049901 A1 | * | 3/2019 |

OTHER PUBLICATIONS

Written Opinion Corresponding to PCT/JP2016/086365 dated Feb. 28, 2017.

* cited by examiner

HYDROELECTRIC GENERATING DEVICE

TECHNICAL FIELD

The present invention relates to a hydraulic power generating apparatus capable of easily disposing a rotor supporting housing for a power generator in a waterway or a water conducting pipe.

BACKGROUND OF THE INVENTION

A power generating apparatus disposed a long rotor shaft in a water conducting pipe and equipped a plurality of rotors on a rotor shaft is disclosed for example, in Patent Literature 1.

PRIOR ART

Patent Literature

Patent Literature 1: JP2000-9012A

SUMMARY OF THE INVENTION

Problem to be Solved by the Invention

In the invention disclosed in the above-mentioned Patent Literature 1, a plurality of power generators are disposed via mounting fittings at the front and rear inside a long water conducting pipe.

In this mode, it is difficult to arrange power generators inside a long water conducting pipe. In addition, when a large number of generators are fixed in the water conducting pipe so as to be in close contact with each other, the generators become resistance to water flow and the water velocity flowing through the water conducting pipe decreases, so that the rotation speed of the rotor does not rise and a power generation efficiency also hardly increases.

The present invention provides a power generating apparatus capable of easily generating hydraulic power by installing a mounting ring so as to laterally surround a rotor housing for a power generator, and by hanging the mounting ring in the waterway or connecting it to the middle of the long water conducting pipe.

Means for Solving the Problems

Special features of the present invention are as follows.

(1) The hydraulic power generating apparatus of the present invention comprises a horizontal rotor supporting housing having a rotor, a holding body erected on an upper surface of the rotor supporting housing, a support ring in which the rotor supporting housing is fixed, and a power generator, wherein the rotor supporting housing is integrally fixed within the support ring by the holding body, the power generator is disposed on the upper part of the holding body protruding upward from the support ring, the support ring is formed with attachment portions for fixing the rotor supporting housing in a water channel.

(2) The hydraulic power generating apparatus according to (1) above, wherein the holding body is a cylindrical body, and includes a transmission shaft for transmitting a rotational force of a rotor shaft to the power generator, and a connecting portion for connecting an auxiliary holding body is formed on an upper surface of the holding body.

(3) The hydraulic power generating apparatus according to (1) or (2) above, wherein the attachment portion of the support ring is an outward flange having bolt holes opened at constant intervals.

(4) The hydraulic power generating apparatus according to any one of (1) to (3) above, wherein the water channel is a water conducting pipe for conducting water from a water source, and the support ring is disposed between the front and rear water conducting pipes having an outward flange at the front and rear, and the attachment portion is connected to the flange of the water conducting pipe.

(5) The hydraulic power generating apparatus according to any one of (1) to (3) above, wherein the water channel is a waterway, and a hanging member attached to the attachment portion of the support ring is fixed on a beam installed on the water surface.

(6) The hydraulic power generating apparatus according to any one of (1) to (5) above, wherein a rotor shaft of the rotor is disposed at a position deviating downward from a center of the support ring.

(7) The hydraulic power generating apparatus according to any one of (1) to (6) above, wherein a cross section of the holding body is substantially fish shape with thick front and narrowing backward.

Advantages of the Invention

According to the present invention, the following effects can be obtained.

In the hydraulic power generating apparatus according to the invention described in the above (1), the rotor supporting housing is integrally fixed inside the support ring with the holding body, a power generator is disposed in the holding body protruding from the support ring, so that one power generating apparatus is configured.

In order to easily attach this hydraulic power generating apparatus to a water channel such as a waterway or a water conducting pipe, an attachment portion is formed on the support ring. The attachment portion of the support ring can be connected to water conducting pipes of the same diameter, and it can be connected to the water conducting pipes of different pipe diameters via a relay pipe having different front and rear diameters for connecting water conducting pipes of different pipe diameters.

For example, when the rotor supporting housing is made horizontal between front and rear water conducting pipes and the attachment portions of the support ring are connected to the front and rear water conducting pipes, the rotor of the rotor supporting housing is rotated by the running water through the water conducting pipe to be able to generate electricity. Alternatively, by fixing the hanging member to the attachment portions and hanging it on a beam installed on the water channel, the power generator can be easily arranged in the water channel.

In the invention described in the above (2), since the holding body is the cylindrical body, a transmission shaft for transmitting the rotational force of the rotor to the power generator can be disposed inside the holding body. Since the auxiliary holding body can be connected to the upper surface of the holding body, even if the water surface of the water channel is low, the rotor supporting housing can be easily hanged in water from the beam installed on the water channel.

In the invention described in the above (3), since the attachment portions of the support ring are outward flanges formed at the front and rear of the support ring and bolt holes are formed at constant intervals, by fastening a fixture at the lower portion of the hanging member to this flange with bolts and hanging a fixture at the upper portion of the hanging member on the beam installed on the water channel, the power generator can be easily arranged in the water channel.

In addition, the support ring is disposed between the front and rear water conducting pipes, and the attachment portion of the support ring can be connected to the flange of the water conducting pipe with bolts.

In the invention described in the above (4), when a long water conducting pipe is used as a water channel, and a support ring is disposed between front and rear water conducting pipes having front and rear flanges, and flanges as an attachment portion are connected with bolts, the rotor can rotate and generate electricity by the running water flowing in the water conducting pipe conducting from the water source.

In the invention described in the above (5), by using the waterway as the water channel and fixing the upper part of the hanging member attached to the attachment part of the support ring on the beam installed on the water surface, the hydraulic power generating apparatus can be easily installed in the waterway.

In the invention described in the above (6), since the rotor shaft is disposed at a position deviating downward from the center of the support ring, against the flow velocity decreases due to the water flow striking the front face of the holding body, by making the flowing water volume above the rotor supporting housing equal to the flowing water volume below the rotor supporting housing in the support ring, it is possible to equalize the water flow rate with respect to the rotor. In addition, when the amount of water in the water channel decreases, the water flow in the lower level can be utilized.

In the invention described in the above (7), since the cross section of the holding body is formed into a substantially fish shape with thick front and narrowing backward, the water flow impinging on the holding body passes at high speed due to the Coanda effect, so that slowing down of water flow is suppressed.

EMBODIMENTS OF THE INVENTION

An embodiment of the present invention will be described below with reference to the drawings.

Example 1

Figure 1:
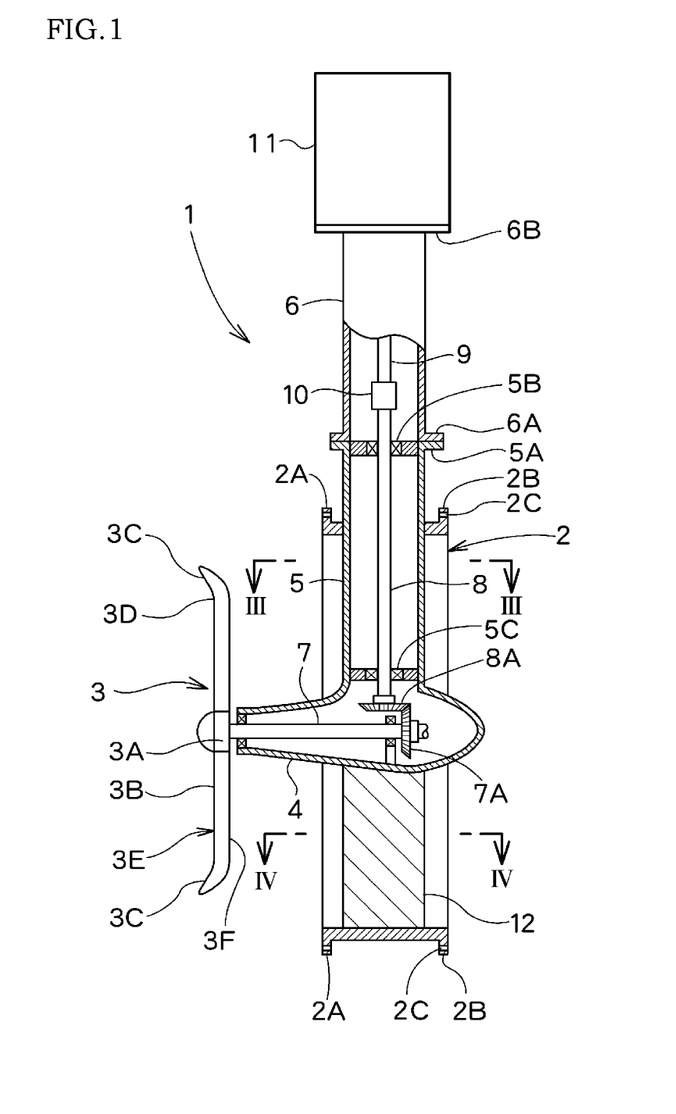
FIG. 1 is a side view of an embodiment of the present invention.
Figure 2:
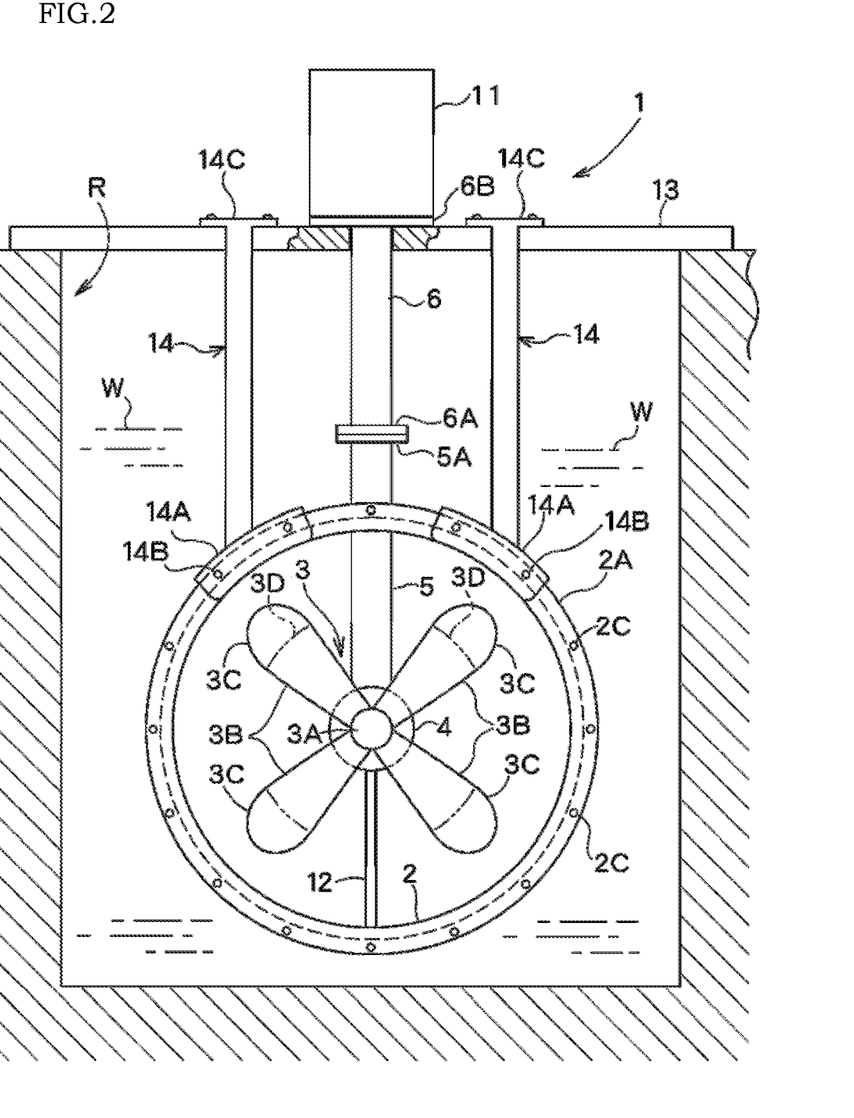
FIG. 2 is a front view of a usage example 1 of the hydraulic power generating apparatus shown in FIG. 1.

As shown in FIGS. 1 and 2, a hydraulic power generating apparatus 1 of the present invention has the same diameter as a water conducting pipe 21 for drawing water from a water source, a horizontal rotor supporting housing 4 provided with a rotor 3 is integrally fixed by a vertical holding body 5 to the inside of a support ring 2 having a short length.

Figure 3:
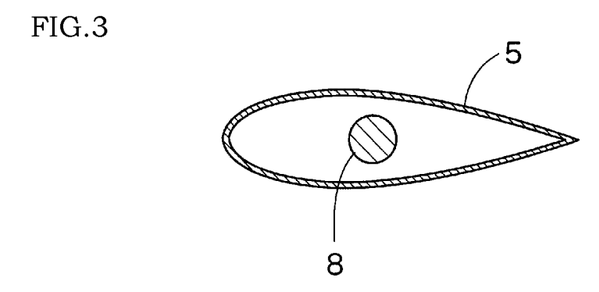
FIG. 3 is a cross-sectional view taken along the line III-III of the holding body in FIG. 1.
Figure 4:
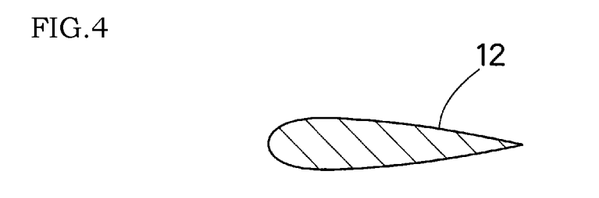
FIG. 4 is a cross-sectional view taken along the line IV-IV of the support column in FIG. 1.

In addition, at the lower surface of the rotor supporting housing 4, a support plate 12 long in the front-to-rear direction is fixed between lower inner wall surfaces of the support ring 2. As shown in a cross-sectional view of FIG. 3, the holding body 5 is a hollow body having a substantially fish shape in a plan view, a transmission shaft 8 is disposed inside the holding body 5 and is pivotally supported by upper and lower bearings 5B, 5C as shown in FIG. 1. As shown in FIG. 4, the support plate 12 is the fish shape in a plan view. The water flow impinging on the holding body 5 and the support plate 12 passes at high speed by Coanda effect.

Outward flanges 2A and 2B serving as attachment portions are protruded from the front and rear peripheral surfaces of the support ring 2, and bolt holes 2C are formed in the front and rear direction at constant intervals at the outward flanges 2A and 2B so as to be connectable with the water conducting pipe 12.

An auxiliary holding body 6 is connected to the upper part of the holding body 5 via outward flanges 5A, 6A, and a power generator 11 is installed on the upper side of the auxiliary holding body 6.

The auxiliary holding body 6 is used when the water surface of a water channel R is low, and the auxiliary holding body 6 is not used unless a water surface is low.

A horizontal rotor shaft 7 is disposed inside the rotor supporting housing 4, and a rotor 3 is mounted on the front end of the rotor shaft 7. A plurality of lift-type blades 3B (hereinafter simply referred to as blades) are mounted on the circumferential surface of a hub 3A of the rotor 3 in a radial direction. The tip of the blade 3B is an inclined portion 3C which is inclined forward.

The rear end portion of the rotor shaft 7 and the lower end portion of the transmission shaft 8 in the holding body 5 are linked by transmission means comprising bevel gears 7A and 8A. The upper end of the transmission shaft 8 is connected to an auxiliary transmission shaft 9 via a connecting tool 10 in the portion of the holding body 5, and the upper end portion of the auxiliary transmission shaft 9 is connected to a main shaft of the power generator 11. A plate-shaped support plate 12 elongated in the front-rear direction is fixed to a lower surface of a bearing housing 4 disposed below the holding body 5.

The tip portion of the blade 3B is the inclined portion 3C that is inclined by about 35 to 45 degrees in the front direction. The blade 3B is gradually widened in string length from the blade root to the blade tip, and the maximum string length is set from 35 to 50% of a turning radius and a water receiving area at a centrifugal portion is set to be large. The inclined portion 3C is inclined in the upstream direction with the maximum string length portion 3D as a base point.

Figure 5:
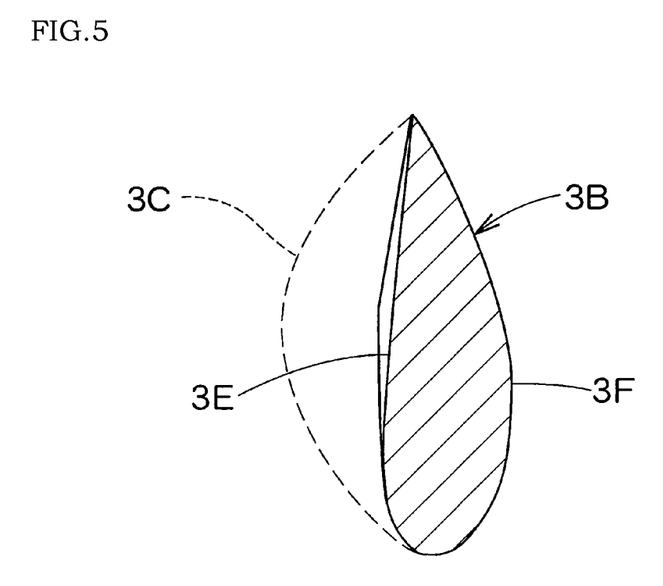
FIG. 5 is a cross-sectional view of the maximum string length portion of the blade in FIG. 1.

The thickness of the blade 3B is parallel from the blade root to the blade tip in a side view, and the maximum thickness is set from 25 to 35% of the string length as shown by the cross section in FIG. 5.

When it exceeds 35%, the resistance becomes large, and the speed difference of the running water along a front face 3E and a back face 3F becomes large, and the rotation efficiency decreases. On the other hand, when it is 25% or less, the water velocity passing along the back surface 3F and the reaction by it are also small, and the rotation efficiency is difficult to increase.

When the blade 3B rotates, due to a large bulge of the back face 3F, the water flow passing along the back face 3F flows at a higher speed than the water flow passing along the front face 3E, as a reaction, the rotation speed of the blade 3B increases.

FIG. 2 is a front view showing a state in which the hydraulic power generating apparatus 1 is used in a water channel R for agriculture.

The hydraulic power generating apparatus 1 is fixed by hanging a flange 6B of the upper end of the auxiliary holding body 6 on a beam 13 installed above the water surface of the water channel R.

Further, the fixture 14A at the lower portion of a hanging member 14 is fixed to the attachment portions 2A, 2B at the front and rear of the support ring 2 with bolts 14B or the like, a fixture 14C at the upper portion of the hanging member 14 is fixed to the beam 13.

As a result, the support ring 2 is fixed to the beam 13 by the hanging members 14 fixed to the attachment portions 2A, 2B at the front and rear of the support ring 2, so that the support ring 2 is firmly fixed without moving even if water pressure is applied to the rotor 3.

Figure 6:
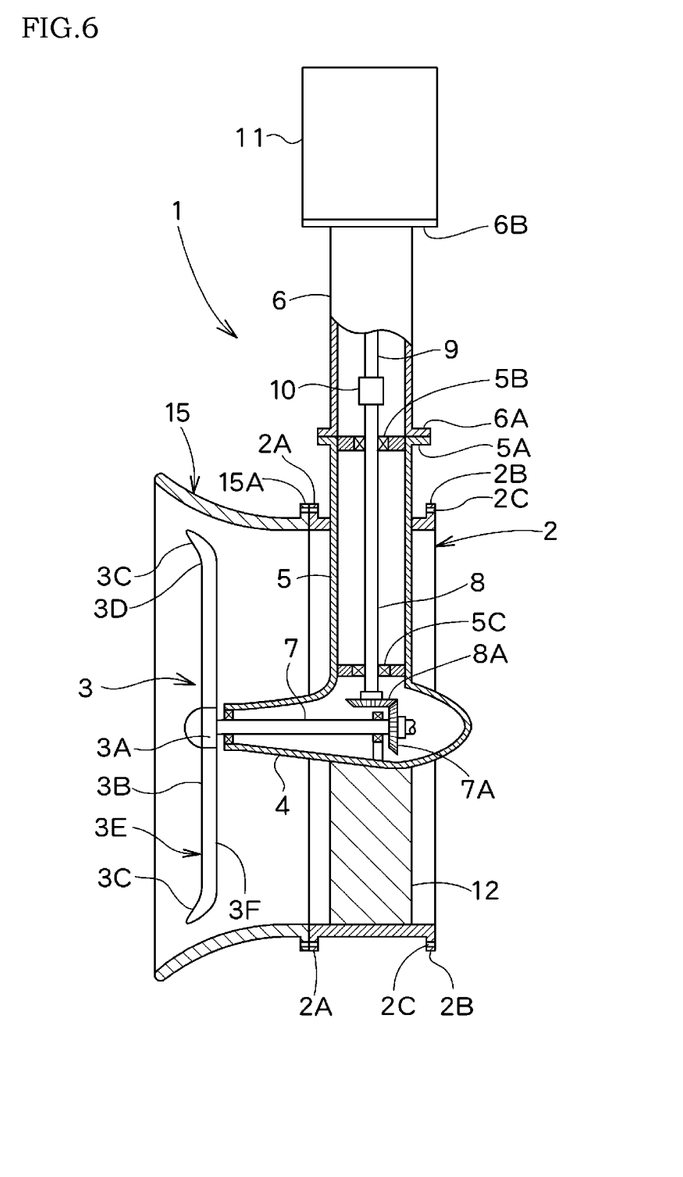
FIG. 6 is a side view of a usage example 2 of the hydraulic power generating apparatus of the present invention.

FIG. 6 shows a usage example in which a water collecting pipe 15 is fixed to the front face of the support ring 2 by connecting attachment portions 2A, 15A to each other. By making this water collecting pipe 15 face rearward, it can also be attached to the attachment portion 2B on the rear portion. Thereby, the vicinity of the rotor supporting housing 4 can be a narrow path.

Figure 7:
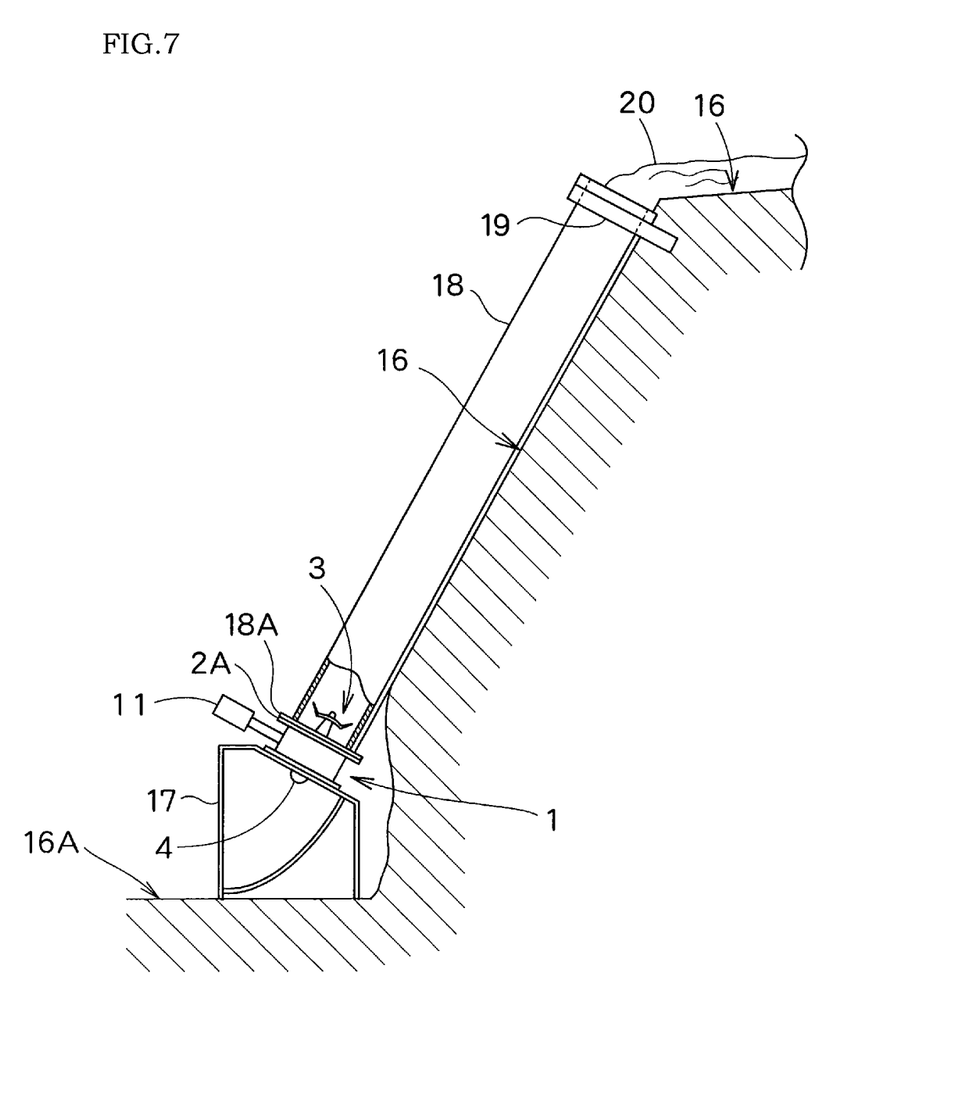
FIG. 7 is a side view of a usage example 3 of the hydraulic power generating apparatus of the present invention.

FIG. 7 is a side view showing a mode in which the hydraulic power generating apparatus 1 is used in a place with a water head. The same reference signs are attached to the same members as a previous example, and a description is omitted. This is to utilize a water head at a small waterfall and a cliff.

A support frame 17 is provided on a lowland 16A of a cliff 16, and the rotor 3 is faced upward, then the hydraulic power generating apparatus 1 is fixed. The water conducting pipe 18 is connected above the supporting ring 2 via outward flanges 2A, 18A respectively.

The upper part of the water conducting pipe 18 is fixed to the cliff 16 with a fixing member 19. The pipe opening at the upper part of the water conducting pipe 18 is aligned with a water conducting channel 20. The water conducting channel 20 may be drawn from another water source using the water conducting pipe 18 or may use a small stream.

As a result, even if a flow rate is small, the running water having a water head can be guided to the hydraulic power generating apparatus 1 by the water conducting pipe 18, so that, even if a pipe diameter of the water conducting pipe 18 is small, the power generation efficiency can be increased by the water head.

Figure 8:
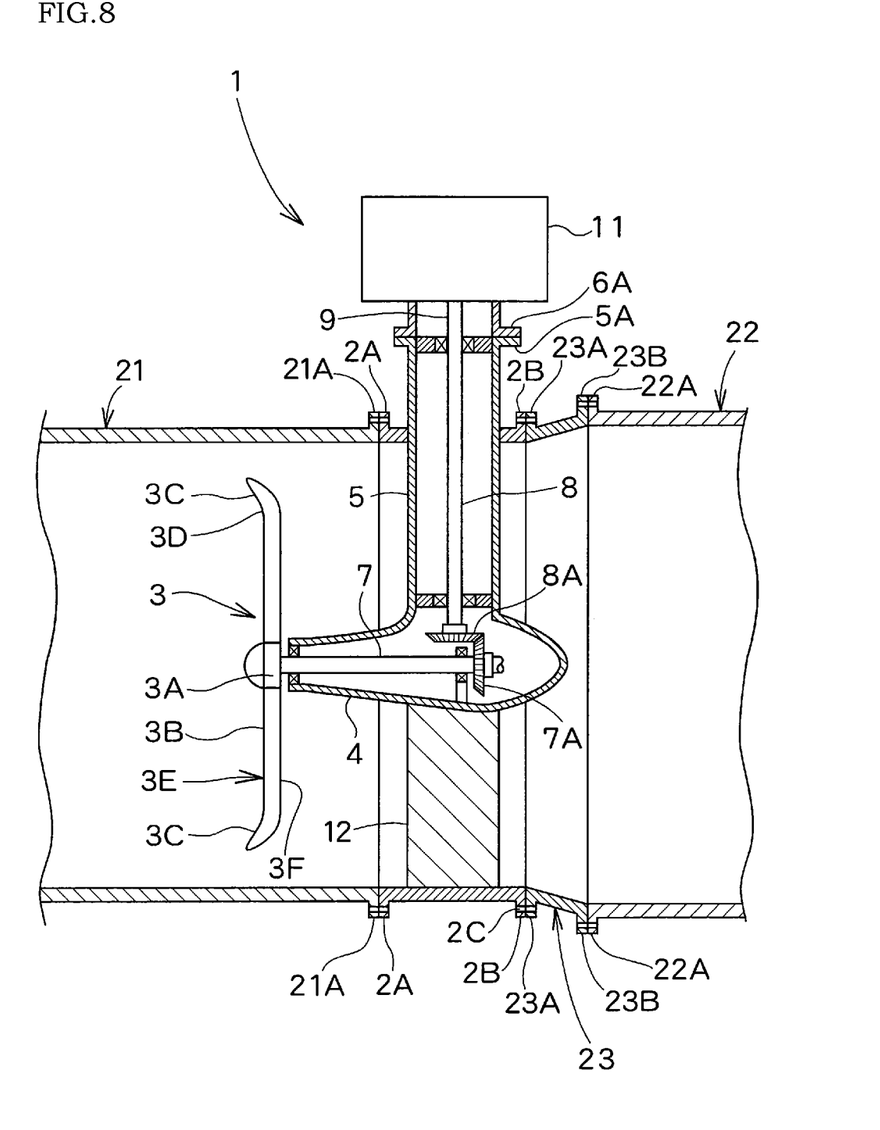
FIG. 8 is a side view of a usage example 4 of the hydraulic power generating apparatus of the present invention.

FIG. 8 is a side view showing a state in which the hydraulic power generating apparatus 1 is used for water conducting pipes 21, 22 for drawing water from a water source to a destination for a long distance. The same reference signs are attached to the same members as a previous example, and a description is omitted.

The water conducting pipe 21 has, for example, a length of 10 m per each pipe and is connected for several kilometers. The pipe diameter is, for example, 70 cm.

If the location is compatible, since the water conducting pipe 21 can be arranged for as long as several kilometers, when the hydraulic power generating apparatus 1 of the present invention is disposed, for example, at every 10 m of the long water conducting pipe 21, 100 hydraulic power generating apparatuses 1 can be arranged assuming that 1 km of water conducting pipe 21 is connected.

For example, even with a small power generator 11 of 500 W, if 100 units can be installed, a power generation facility capable of stable power generation of 50 kW is realized.

In this case, the water conducting pipe 21 is a downslope from the water source even if the pipe 21 is bent according to the natural terrain and there is a difference in elevation, so that, even if the flow velocity does not change, water gravity is larger at the downstream side than at the upstream side, therefore, the power generation efficiency by each generator is higher in the downstream.

When the spaces between the rotors 3 of the hydraulic power generating apparatus 1 arranged in the front and rear are separated by 10 m, the turbulent flow due to the rotation of the rotor 3 positioned in the front does not affect the rotor 3 positioned in the rear. If there is a geographical condition that the slope is large, it is possible to utilize the water gravity, so that the distance between the front and rear rotors 3, 3 can be reduced.

As shown in FIG. 8, the connection between the water conducting pipe 21 and the support ring 2 is achieved by connecting the attachment portions 2A and 21A with bolts. When the diameter of the water conducting pipe 22 is larger than the diameter of the support ring 2, as shown in the right side of FIG. 8, by using a relay ring 23 having different front and rear diameters, the support ring 2 and the water conducting pipe 22 can be connected even if the pipe diameters are different.

Although the outward flanges are shown as the attachment portions 2A and 2B of the support ring 2, for example, a faucet joint or other known connecting method can be used. In FIG. 1, the holding body 5 is vertical, but in a place where the slope is large, the holding body 5 can be coupled in a horizontal state.

INDUSTRIAL APPLICABILITY

The present invention relates to the hydroelectric power generator capable of easily disposing the rotor for power generation by connecting it to an existing or new water conducting pipe which draws water from a water source, in addition, the power generation facility capable of easily disposing in a waterway, efficiently using the water of the water channel is realized.

REFERENCE SIGNS LIST 1 hydraulic power generating apparatus
2 support ring
2A, 2B attachment portion (outward flange)
2C bolt hole
3 rotor
3A hub
3B lift-type blade
3C inclined portion
3D maximum string length portion
3E front face
3F back face
4 rotor supporting housing
5 holding body
5A outward flange
6 auxiliary holding body
6A outward flange
6B flange
7 rotor shaft
7A bevel gear 8 transmission shaft
8A bevel gear
9 auxiliary transmission shaft
10 connecting tool
11 power generator
12 support plate
13 beam
14 hanging member
14A fixture
14B bolt
14C fixture
15 water collecting pipe
15A attachment portion
16 cliff
17 support frame
18 water conducting pipe
18A attachment portion
19 fixing member
20 water channel
21, 22 water conducting pipe
21A, 22A attachment portion
23 relay ring
23A, 23B attachment portion
R water channel
W water surface

What is claimed is:

1. A hydraulic power generating apparatus comprising:
a horizontal rotor supporting housing having a rotor;
a holding body erected on an upper surface of the rotor supporting housing;
a support ring in which the rotor supporting housing is fixed;
a power generator; and
the rotor supporting housing is integrally fixed within the support ring by the holding body, the power generator is disposed on an upper part of the holding body protruding from the support ring, and the support ring is formed with attachment portions for fixing the rotor supporting housing in a water channel;
wherein the holding body is a cylindrical body, and includes a transmission shaft for transmitting a rotational force of a rotor shaft to the power generator; and
a connecting portion is formed on an upper surface of the holding body, and a removable auxiliary holding body connects the power generator to the connecting portion of the holding body.

2. The hydraulic power generating apparatus according to claim 1, wherein the attachment portion of the support ring is an outward flange having bolt holes opened at constant intervals.

3. The hydraulic power generating apparatus according to claim 2, wherein the water channel is a water conducting pipe for conducting water from a water source, and the support ring is disposed between the front and rear water conducting pipes having an outward flange at the front and rear, and the attachment portion is connected to the flange of the water conducting pipe.

4. The hydraulic power generating apparatus according to claim 2, wherein the water channel is a waterway, and a suspension member attached to the attachment portion of the support ring is fixed on a beam installed on both banks of the waterway.

5. The hydraulic power generating apparatus according to claim 2, wherein a rotor shaft of the rotor is disposed at a position deviating downward from a center of the support ring.

6. The hydraulic power generating apparatus according to claim 2, wherein a transverse cross section of the holding body has a substantially streamline shape with a thicker leading end and a narrowing trailing end.

7. The hydraulic power generating apparatus according to claim 1, wherein the water channel is a water conducting pipe for conducting water from a water source, and the support ring is disposed between the front and rear water conducting pipes having an outward flange at the front and rear, and the attachment portion is connected to the flange of the water conducting pipe.

8. The hydraulic power generating apparatus according to claim 7, wherein a rotor shaft of the rotor is disposed at a position deviating downward from a center of the support ring.

9. The hydraulic power generating apparatus according to claim 7, wherein a transverse cross section of the holding body has a substantially streamline shape with a thicker leading end and a narrowing trailing end.

10. The hydraulic power generating apparatus according to claim 1, wherein the water channel is a waterway, and a suspension member attached to the attachment portion of the support ring is fixed on a beam installed on both banks of the waterway.

11. The hydraulic power generating apparatus according to claim 10, wherein a rotor shaft of the rotor is disposed at a position deviating downward from a center of the support ring.

12. The hydraulic power generating apparatus according to claim 10, wherein a transverse cross section of the holding body has a substantially streamline shape with a thicker leading end and a narrowing trailing end.

13. The hydraulic power generating apparatus according to claim 1, wherein a rotor shaft of the rotor is disposed at a position deviating downward from a center of the support ring.

14. The hydraulic power generating apparatus according to claim 1, wherein a transverse cross section of the holding body has a substantially streamline shape with a thicker leading end and a narrowing trailing end.

* * * * *